United States Patent [19]

Göbl et al.

[11] 4,261,648

[45] Apr. 14, 1981

[54] PANCRATIC OBJECTIVE

[75] Inventors: Irmgard Göbl, Kitzbühel; Trude Muszumanski; Franz J. Pörscht, both of Vienna, all of Austria

[73] Assignees: Karl Vockenhuber; Raimund Hauser, both of Vienna, Austria

[21] Appl. No.: 911,328

[22] Filed: Jun. 1, 1978

[30] Foreign Application Priority Data

Jun. 2, 1977 [AT] Austria ................................. 3891/77

[51] Int. Cl.³ .............................................. G02B 15/16
[52] U.S. Cl. .................................................. 350/423
[58] Field of Search ........................ 350/184, 186, 176

[56] References Cited

U.S. PATENT DOCUMENTS

| 3,784,283 | 1/1974 | Muszumanski et al. | 350/184 |
| 4,105,291 | 8/1978 | Tsuji | 350/184 |

Primary Examiner—Paul A. Sacher
Attorney, Agent, or Firm—Montague & Ross

[57] ABSTRACT

An objective of the pancratic type includes a varifocal front lens group and a fixed-focus rear lens group, the latter consisting of five air-spaced singlets. The front lens group is constituted by a positive first component consisting of three singlets, an axially shiftable negative second component consisting of a singlet and a doublet, and an axially shiftable positive third component in the form of a nearly planoconvex singlet of low power.

10 Claims, 3 Drawing Figures

PANCRATIC OBJECTIVE

FIELD OF THE INVENTION

Our present invention relates to an optical objective of the pancratic or varifocal type comprising a front lens group of variable focal length and a fixed-focus rear lens group, the front group consisting of a substantially stationary positively refracting first component (which may be limitedly shiftable for focusing purposes), an axially shiftable negatively refracting second component and an axially shiftable positively refracting third component.

BACKGROUND OF THE INVENTION

Objectives of the so-called XL (=existing light) class, designed to take indoor pictures without additional illumination, generally have relative apertures of about 1:1.3 or larger. In many instances, as described for example in commonly owned U.S. Pat. No. 3,989,349, the rear lens group of such an objective consists of five air-spaced lens members. In an objective of the type here contemplated, e.g. as known from U.S. Pat. Nos. 3,044,355, 3,074,317 and 3,580,662 as well as German published specification No. 2,526,847, the diaphragm is usually located immediately in front of this rear lens group and is preceded by the shiftable positive third component. Obviously, this third component as well as the lenses of the rear group must have diameters compatible with the overall relative aperture as determined by the interposed diaphragm; thus, the third component must be a fairly large lens member though generally smaller than the member or members of the front component whose diameter determines the field of view.

Unless the third component is a lens member of large individual focal length $f_3$, its spherical aberrations create problems which heretofore were resolved by designing this lens member as a cemented doublet. An excessive increase of focal length $f_3$ generally leads to objectionably large dimensions for the varifocal front group or necessitates a reduction in the varifocal ratio if the desired large relative aperture is to be preserved. As a practical rule, the individual focal length $f_2$ of the second (negative) component should be on the same order of magnitude as the median overall focal length $f_{med}$ of the entire objective, i.e. the focal length existing at the inversion point of the path of the third component which then lies in a position farthest from the rear lens group. With modern objectives, the preferred absolute value of $f_2$ ranges between about 0.7 and 1.5 times $f_{med}$.

OBJECT OF THE INVENTION

The object of our present invention is to provide a pancratic objective of the aforedescribed type which, with a varifocal ratio of almost 3:1 and a relative aperture of at least 1:1.3, allows the use of a single lens as the positive third component without unduly increasing the total axial length of the objective.

SUMMARY OF THE INVENTION

We have found, in accordance with our present invention, that this object can be realized by making the ratio between the absolute values of the individual focal lengths of the third and second components, i.e. $f_3/|f_2|$, greater than 1.5 times the varifocal ratio $R_v = f_{max}/f_{min}$ where $f_{max}$ is the maximum and $f_{min}$ is the minimum overall focal length.

Advantageously, $f_2$ has an absolute value less than $f_{med}$, preferably about $4f_{med}/5$.

BRIEF DESCRIPTION OF THE DRAWING

The above and other features of our invention will now be described in detail with reference to the accompanying drawing in which.

SPECIFIC DESCRIPTION

Figure 1:
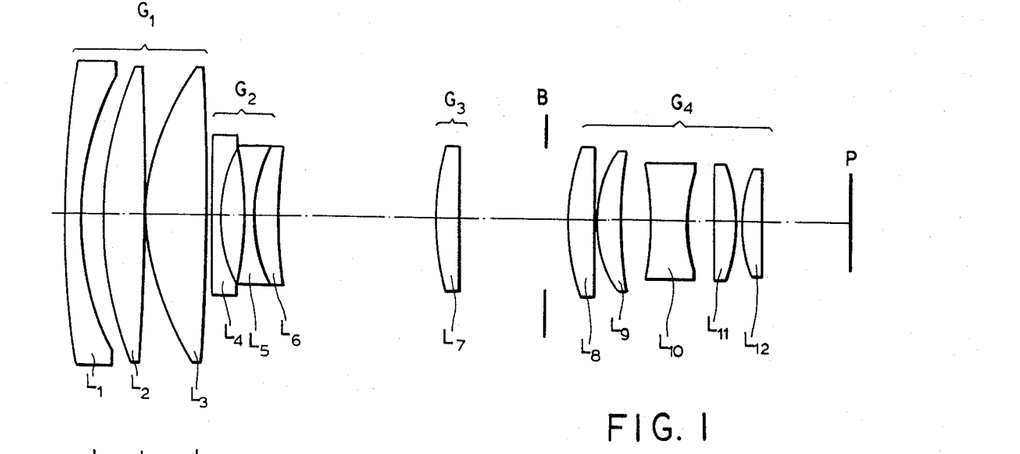
FIG. 1 shows a pancratic objective according to our invention in a wide-angle position corresponding to an overall focal length $f_{min}$.
Figure 2:
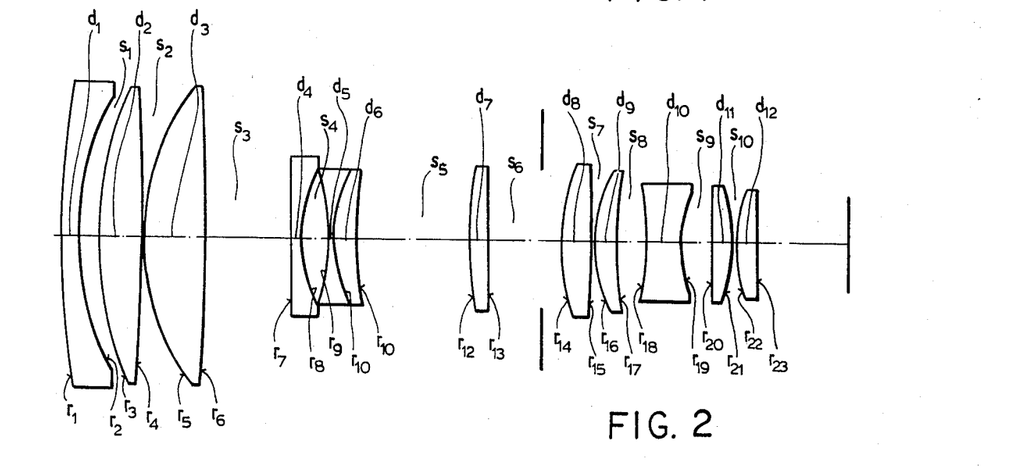
FIG. 2 shows the same objective in an intermediate position corresponding to an overall focal length $f_{med}$.
Figure 3:
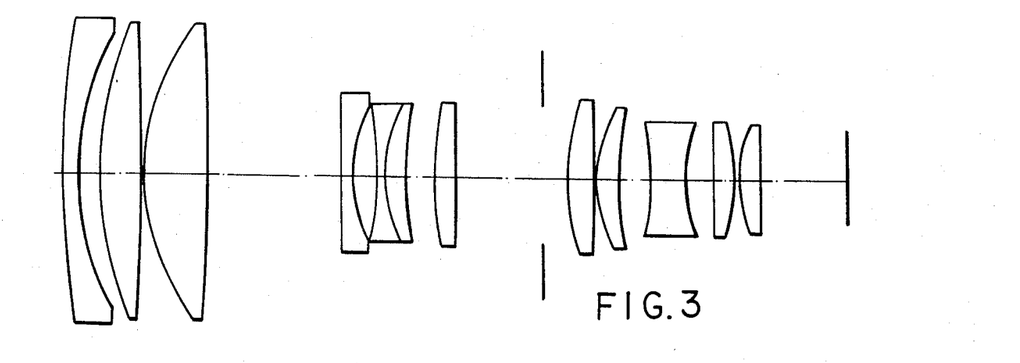
FIG. 3 shows that objective in a telephoto position corresponding to an overall focal length $f_{max}$.

The objective shown in the drawing consists of a substantially fixed first component $G_1$ of positive refractivity, an axially shiftable second component $G_2$ of negative refractivity, an axially shiftable third component $G_3$ of positive refractivity, and a rear group $G_4$ composed of five air-spaced lenses. A diaphragm B is interposed between components $G_3$ and $G_4$. The image plane of the objective has been shown at P.

Component $G_1$ consists of three air-spaced singlets, namely a front lens $L_1$ in the form of a negative meniscus with radii $r_1$, $r_2$ and a thickness $d_1$, a positive lens $L_2$ with radii $r_3$, $r_4$ and a thickness $d_2$, and a positive lens $L_3$ with radii $r_5$, $r_6$ and a thickness $d_3$. Component $G_2$ consists of a negative singlet $L_4$ (radii $r_7$, $r_8$ and thickness $d_4$) and a doublet composed of a negative lens $L_5$ (radii $r_9$, $r_{10}$ and thickness $d_5$) and a positive lens $L_6$ (radii $r_{10}$, $r_{11}$ and thickness $d_6$). Component $G_3$ is a positive singlet $L_7$ (radii $r_{12}$, $r_{13}$ and thickness $d_7$). The five singlets making up the rear component $G_4$ are a generally planoconvex lens $L_8$ (radii $r_{14}$, $r_{15}$ and thickness $d_8$), a positive meniscus $L_9$ (radii $r_{16}$, $r_{17}$ and thickness $d_9$), a biconcave lens $L_{10}$ (radii $r_{18}$, $r_{19}$ and thickness $d_{10}$), a generally planoconvex lens $L_{11}$ (radii $r_{20}$, $r_{21}$ and thickness $d_{11}$), and a generally planoconvex lens $L_{12}$ (radii $r_{22}$, $r_{23}$ and thickness $d_{12}$). The air spaces separating the several lens members from one another have been designated $s_1$–$s_{10}$.

Advantageously, the more strongly curved side of lens $L_8$ is its front surface $r_{14}$ whose surface power $\Phi_{14}$ ranges between 0.4 and 0.7 times $\Phi_{med}$, the latter being the overall power of the objective in its median position corresponding to focal length $f_{med}$. The forwardly facing convex surface $r_{16}$ of lens $L_9$ should have a surface power $\Phi_{16}$ ranging between $0.6\Phi_{med}$ and $0.9\Phi_{med}$. The surface powers $\Phi_{18}$ and $\Phi_{19}$ of the front and rear surfaces $r_{18}$ and $r_{19}$ of lens $L_{10}$ are preferably related to each other by a ratio of $\Phi_{19}/\Phi_{18}$ ranging between unity and 2.5. The convex rear surface $r_{21}$ of lens $L_{11}$ should have a power $\Phi_{21}$ ranging between $0.7\Phi_{med}$ and $\Phi_{med}$. The same applies to the surface power $\Phi_{22}$ of the convex front surface of lens $L_{12}$. These two last lenses $L_{11}$ and $L_{12}$ may in fact be mirror images of each other.

In the following Tables I–VII we have given specific numerical values for the radii $r_1$–$r_{23}$, the lens thicknesses $d_1$–$d_{12}$, the separations $s_1$–$s_{10}$, the refractive indices $n_d$ and the Abbé numbers $\nu_d$ of lenses $L_1$–$L_{12}$ for a number of representative embodiments. The radii, thicknesses and separations are based upon a numerical value of unity for the median overall focal length $f_{med}$. Air space $s_6$ consists of a variable distance, separating lens $L_7$ from diaphragm B, and an invariable distance between that diaphragm and lens $L_8$.

TABLE I

| Lens | Radii | Thicknesses and Separations | | $n_d$ | $\nu_d$ | Surface Powers |
|---|---|---|---|---|---|---|
| $L_1$ | $r_1 = +6.386$ | $d_1 =$ | 0.106 | 1.805 | 25.4 | |
| | $r_2 = +1.994$ | | | | | |
| | | $s_1 =$ | 0.143 | | | |
| $L_2$ | $r_3 = +2.704$ | $d_2 =$ | 0.305 | 1.603 | 60.6 | |
| | $r_4 = -13.757$ | | | | | |
| | | $s_2 =$ | 0.006 | | | |
| $L_3$ | $r_5 = +1.724$ | $d_3 =$ | 0.373 | 1.658 | 50.9 | |
| | $r_6 = -42.460$ | | | | | |
| | | $s_3 =$ | $\begin{cases} 0.050\ f_{min} \\ 0.588\ f_{med} \\ 0.911\ f_{max} \end{cases}$ | | | |
| $L_4$ | $r_7 = -72.759$ | $d_4 =$ | 0.059 | 1.713 | 53.8 | |
| | $r_8 = +0.821$ | | | | | |
| | | $s_4 =$ | 0.165 | | | |
| $L_5$ | $r_9 = -2.395$ | $d_5 =$ | 0.056 | 1.589 | 61.3 | |
| | $r_{10} = +0.914$ | | | | | |
| $L_6$ | $r_{11} = +2.836$ | $d_6 =$ | 0.149 | 1.805 | 25.4 | |
| | | $s_5 =$ | $\begin{cases} 1.031\ f_{min} \\ 0.725\ f_{med} \\ 0.179\ f_{max} \end{cases}$ | | | |
| $L_7$ | $r_{12} = +2.091$ | $d_7 =$ | 0.137 | 1.517 | 64.2 | |
| | $r_{13} = -11.609$ | | | | | |
| | | $s_6 =$ | $\begin{cases} 0.581+0.280\ f_{min} \\ 0.348+0.280\ f_{med} \\ 0.572+0.280\ f_{max} \end{cases}$ | | | |
| $L_8$ | $r_{14} = +1.027$ | $d_8 =$ | 0.211 | 1.620 | 60.3 | $\Phi_{14} = +0.6037$ |
| | $r_{15} = -10.449$ | | | | | |
| | | $s_7 =$ | 0.006 | | | |
| $L_9$ | $r_{16} = +0.812$ | $d_9 =$ | 0.137 | 1.624 | 47.0 | $\Phi_{16} = +0.7685$ |
| | $r_{17} = +1.684$ | | | | | |
| | | $s_8 =$ | 0.137 | | | |
| $L_{10}$ | $r_{18} = -1.534$ | $d_{10} =$ | 0.140 | 1.847 | 28.8 | $\Phi_{18} = -0.5522$ |
| | $r_{19} = +0.773$ | | | | | $\Phi_{19} = -1.0957$ |
| | | $s_9 =$ | 0.211 | | | |
| $L_{11}$ | $r_{20} = -56.811$ | $d_{11} =$ | 0.165 | 1.713 | 53.8 | |
| | $r_{21} = -0.786$ | | | | | |
| | | $s_{10} =$ | 0.006 | | | $\Phi_{21} = +0.9071$ |
| $L_{12}$ | $r_{22} = +0.855$ | $d_{11} =$ | 0.118 | 1.717 | 48.0 | $\Phi_{22} = +0.8386$ |
| | $r_{23} = +2.356$ | | | | | |

$f_{min} = 0.591$
$f_{med} = 1$
$f_{max} = 1.632$
relative aperture = 1:1.3
$f_2 = -0.808$
$f_3 = +3.441$

TABLE II

| Lens | Radii | Thicknesses and Separations | | $n_d$ | $\nu_d$ | Surface Powers |
|---|---|---|---|---|---|---|
| $L_1$ | $r_1 = +6.397$ | $d_1 =$ | 0.106 | 1.805 | 25.4 | |
| | $r_2 = +1.968$ | | | | | |
| | | $s_1 =$ | 0.143 | | | |
| $L_2$ | $r_3 = +2.585$ | $d_2 =$ | 0.304 | 1.603 | 60.6 | |
| | $r_4 = -13.657$ | | | | | |
| | | $s_2 =$ | 0.006 | | | |
| $L_3$ | $r_5 = +1.700$ | $d_3 =$ | 0.360 | 1.651 | 55.9 | |
| | $r_6 = -70.269$ | | | | | |
| | | $s_3 =$ | $\begin{cases} 0.046\ f_{min} \\ 0.584\ f_{med} \\ 0.907\ f_{max} \end{cases}$ | | | |
| | $r_7 = \infty$ | | | | | |

TABLE II-continued

| Lens | Radii | Thicknesses and Separations | | $n_d$ | $v_d$ | Surface Powers |
|---|---|---|---|---|---|---|
| $L_4$ | $r_8 = +0.836$ | $d_4 =$ | 0.059 | 1.713 | 53.8 | |
| | | $s_4 =$ | 0.165 | | | |
| $L_5$ | $r_9 = -2.796$ | $d_5 =$ | 0.056 | 1.643 | 58.0 | |
| | $r_{10} = +0.897$ | | | | | |
| $L_6$ | | $d_6 =$ | 0.149 | 1.847 | 23.8 | |
| | $r_{11} = +2.697$ | | | | | |
| | | $s_5 =$ | $\begin{cases} 1.055\ f_{min} \\ 0.748\ f_{med} \\ 0.194\ f_{max} \end{cases}$ | | | |
| $L_7$ | $r_{12} = +2.375$ | $d_7 =$ | 0.137 | 1.691 | 54.7 | |
| | $r_{13} = \infty$ | | | | | |
| | | $s_6 =$ | $\begin{cases} 0.578+0.155\ f_{min} \\ 0.348+0.155\ f_{med} \\ 0.578+0.155\ f_{max} \end{cases}$ | | | |
| $L_8$ | $r_{14} = +1.504$ | $d_8 =$ | 0.186 | 1.620 | 60.3 | $\Phi_{14} = +0.4122$ |
| | $r_{15} = -6.705$ | | | | | |
| | | $s_7 =$ | 0.006 | | | |
| $L_9$ | $r_{16} = +0.864$ | $d_9 =$ | 0.145 | 1.620 | 60.3 | $\Phi_{16} = +0.7176$ |
| | $r_{17} = +2.120$ | | | | | |
| | | $s_8 =$ | 0.205 | | | |
| $L_{10}$ | $r_{18} = -1.686$ | $d_{10} =$ | 0.140 | 1.847 | 23.8 | $\Phi_{18} = -0.5024$ |
| | $r_{19} = +0.895$ | | | | | $\Phi_{19} = -0.9464$ |
| | | $s_9 =$ | 0.261 | | | |
| $L_{11}$ | $r_{20} = +9.224$ | $d_{11} =$ | 0.174 | 1.713 | 53.8 | |
| | $r_{21} = -0.963$ | | | | | $\Phi_{21} = +0.7404$ |
| | | $s_{10} =$ | 0.006 | | | $\Phi_{22} = +0.7923$ |
| $L_{12}$ | $r_{22} = +0.905$ | $d_{12} =$ | 0.124 | 1.717 | 48.0 | |
| | $r_{23} = +4.502$ | | | | | |

$f_{min} = 0.590$
$f_{med} = 1$
$f_{max} = 1.637$
relative aperture = 1:1.2
$f_2 = -0.307$
$f_3 = +3.437$

TABLE III

| Lens | Radii | Thicknesses and Separations | | $n_d$ | $v_d$ | Surface Powers |
|---|---|---|---|---|---|---|
| $L_1$ | $r_1 = +6.397$ | $d_1 =$ | 0.106 | 1.805 | 25.4 | |
| | $r_2 = +1.968$ | | | | | |
| | | $s_1 =$ | 0.143 | | | |
| $L_2$ | $r_3 = +2.585$ | $d_2 =$ | 0.304 | 1.603 | 60.6 | |
| | $r_4 = -13.656$ | | | | | |
| | | $s_2 =$ | 0.006 | | | |
| $L_3$ | $r_5 = +1.700$ | $d_3 =$ | 0.360 | 1.651 | 55.9 | |
| | $r_6 = -70.268$ | | | | | |
| | | $s_3 =$ | $\begin{cases} 0.046\ f_{min} \\ 0.584\ f_{med} \\ 0.907\ f_{max} \end{cases}$ | | | |
| $L_4$ | $r_7 = \infty$ | $d_4 =$ | 0.059 | 1.713 | 53.8 | |
| | $r_8 = +0.836$ | | | | | |
| | | $s_4 =$ | 0.165 | | | |
| $L_5$ | $r_9 = -2.795$ | $d_5 =$ | 0.056 | 1.643 | 58.0 | |
| | $r_{10} = +0.897$ | | | | | |
| $L_6$ | | $d_6 =$ | 0.149 | 1.847 | 23.8 | |
| | $r_{11} = +2.697$ | | | | | |
| | | $s_5 =$ | $\begin{cases} 1.055\ f_{min} \\ 0.748\ f_{med} \\ 0.194\ f_{max} \end{cases}$ | | | |
| $L_7$ | $r_{12} = +2.132$ | $d_7 =$ | 0.137 | 1.620 | 60.3 | |
| | $r_{13} = \infty$ | | | | | |
| | | $s_6 =$ | $\begin{cases} 0.578+0.155\ f_{min} \\ 0.348+0.155\ f_{med} \\ 0.578+0.155\ f_{max} \end{cases}$ | | | |

TABLE III-continued

| Lens | Radii | Thicknesses and Separations | | $n_d$ | $v_d$ | Surface Powers |
|---|---|---|---|---|---|---|
| $L_8$ | $r_{14} = +1.390$ | $d_8 =$ | 0.186 | 1.620 | 60.3 | $\Phi_{14} = +0.4460$ |
| | $r_{15} = -13.812$ | | | | | |
| | | $s_7 =$ | 0.006 | | | |
| $L_9$ | $r_{16} = +0.923$ | $d_9 =$ | 0.146 | 1.620 | 60.3 | $\Phi_{16} = +0.6717$ |
| | $r_{17} = +2.200$ | | | | | |
| | | $s_8 =$ | 0.205 | | | |
| $L_{10}$ | $r_{18} = -1.480$ | $d_{10} =$ | 0.233 | 1.847 | 23.8 | $\Phi_{18} = -0.5723$ |
| | $r_{19} = +0.967$ | | | | | $\Phi_{19} = -0.8759$ |
| | | $s_9 =$ | 0.168 | | | |
| $L_{11}$ | $r_{20} = +5.158$ | $d_{11} =$ | 0.174 | 1.713 | 53.8 | |
| | $r_{21} = -0.923$ | | | | | $\Phi_{21} = +0.7725$ |
| | | $s_{10} =$ | 0.006 | | | |
| $L_{12}$ | $r_{22} = +0.886$ | $d_{12} =$ | 0.124 | 1.670 | 47.1 | $\Phi_{22} = +0.7562$ |
| | $r_{23} = +5.172$ | | | | | |

$f_{min} = 0.590$
$f_{med} = 1$
$f_{max} = 1.637$
relative aperture = 1:1.2
$f_2 = -0.807$
$f_3 = +3.438$

TABLE IV

| Lens | Radii | Thicknesses and Separations | | $n_d$ | $v_d$ | Surface Powers |
|---|---|---|---|---|---|---|
| $L_1$ | $r_1 = +6.395$ | $d_1 =$ | 0.106 | 1.805 | 25.4 | |
| | $r_2 = +1.949$ | | | | | |
| | | $s_1 =$ | 0.143 | | | |
| $L_2$ | $r_3 = +2.542$ | $d_2 =$ | 0.304 | 1.603 | 60.6 | |
| | $r_4 = -13.652$ | | | | | |
| | | $s_2 =$ | 0.006 | | | |
| $L_3$ | $r_5 = +1.699$ | $d_3 =$ | 0.360 | 1.651 | 55.9 | |
| | $r_6 = -70.246$ | | | | | |
| | | $s_3 =$ | $\begin{cases} 0.043\ f_{min} \\ 0.581\ f_{med} \\ 0.904\ f_{max} \end{cases}$ | | | |
| $L_4$ | $r_7 = -31.045$ | $d_4 =$ | 0.059 | 1.713 | 53.8 | |
| | $r_8 = +0.829$ | | | | | |
| | | $s_4 =$ | 0.165 | | | |
| $L_5$ | $r_9 = -3.415$ | $d_5 =$ | 0.056 | 1.643 | 58.0 | |
| | $r_{10} = +0.897$ | | | | | |
| $L_6$ | | $d_6 =$ | 0.149 | 1.847 | 23.8 | |
| | $r_{11} = +2.395$ | | | | | |
| | | $s_5 =$ | $\begin{cases} 1.059\ f_{min} \\ 0.752\ f_{med} \\ 0.198\ f_{max} \end{cases}$ | | | |
| $L_7$ | $r_{12} = +2.132$ | $d_7 =$ | 0.137 | 1.620 | 60.3 | |
| | $r_{13} = \infty$ | | | | | |
| | | $s_6 =$ | $\begin{cases} 0.578+0.155\ f_{min} \\ 0.348+0.155\ f_{med} \\ 0.578+0.155\ f_{max} \end{cases}$ | | | |
| $L_8$ | $r_{14} = +1.447$ | $d_8 =$ | 0.186 | 1.620 | 60.3 | $\Phi_{14} = +0.4285$ |
| | $r_{15} = -5.554$ | | | | | |
| | | $s_7 =$ | 0.006 | | | |
| $L_9$ | $r_{16} = +1.005$ | $d_9 =$ | 0.146 | 1.620 | 60.3 | $\Phi_{16} = +0.6169$ |
| | $r_{17} = +2.528$ | | | | | |
| | | $s_8 =$ | 0.205 | | | |
| $L_{10}$ | $r_{18} = -1.277$ | $d_{10} =$ | 0.233 | 1.847 | 23.8 | $\Phi_{18} = -0.6633$ |
| | $r_{19} = +0.987$ | | | | | $\Phi_{19} = -0.8582$ |
| | | $s_9 =$ | 0.168 | | | |
| $L_{11}$ | $r_{20} = +4.244$ | $d_{11} =$ | 0.174 | 1.713 | 53.8 | |
| | $r_{21} = -0.852$ | | | | | |
| | | $s_{10} =$ | 0.006 | | | $\Phi_{21} = +0.8369$ |
| | $r_{22} = +0.830$ | | | | | |

TABLE IV-continued

| Lens | Radii | | Thicknesses and Separations | | $n_d$ | $v_d$ | Surface Powers |
|---|---|---|---|---|---|---|---|
| $L_{12}$ | | | $d_{12} =$ | 0.124 | 1.670 | 47.1 | $\Phi_{22} = +0.8072$ |
| | $r_{23} = +2.485$ | | | | | | |

$f_{min} = 0.590$
$f_{med} = 1$
$f_{max} = 1.638$
relative aperture = 1:1.2
$f_2 = 0.807$
$f_3 = +3.438$

TABLE V

| Lens | Radii | | Thicknesses and Separations | | $n_d$ | $v_d$ | Surface Powers |
|---|---|---|---|---|---|---|---|
| $L_1$ | $r_1 = +7.033$ | $d_1 =$ | | 0.114 | 1.805 | 25.4 | |
| | $r_2 = +2.143$ | | | | | | |
| | | $s_1 =$ | | 0.158 | | | |
| $L_2$ | $r_3 = +2.796$ | $d_2 =$ | | 0.315 | 1.603 | 60.6 | |
| | $r_4 = -15.015$ | | | | | | |
| | | $s_2 =$ | | 0.006 | | | |
| $L_3$ | $r_5 = +1.869$ | $d_3 =$ | | 0.360 | 1.651 | 55.9 | |
| | $r_6 = -77.656$ | | | | | | |
| | | $s_3 =$ | { 0.056 $f_{min}$ 0.660 $f_{med}$ 1.018 $f_{max}$ } | | | | |
| $L_4$ | $r_7 = \infty$ | $d_4 =$ | | 0.063 | 1.713 | 53.8 | |
| | $r_8 = +0.905$ | | | | | | |
| | | $s_4 =$ | | 0.177 | | | |
| $L_5$ | $r_9 = -2.511$ | $d_5 =$ | | 0.063 | 1.643 | 58.0 | |
| | $r_{10} = +0.972$ | | | | | | |
| $L_6$ | | $d_6 =$ | | 0.164 | 1.847 | 23.8 | |
| | $r_{11} = +3.401$ | | | | | | |
| | | $s_5 =$ | { 1.141 $f_{min}$ 0.828 $f_{med}$ 0.269 $f_{max}$ } | | | | |
| $L_7$ | $r_{12} = +2.347$ | $d_7 =$ | | 0.139 | 1.620 | 60.3 | |
| | $r_{13} = \infty$ | | | | | | |
| | | $s_6 =$ | { 0.644+0.158 $f_{min}$ 0.353+0.158 $f_{med}$ 0.554+0.158 $f_{max}$ } | | | | |
| $L_8$ | $r_{14} = +1.135$ | $d_8 =$ | | 0.151 | 1.620 | 60.3 | $\Phi_{14} = +0.5463$ |
| | $r_{15} = -4.127$ | | | | | | |
| | | $s_7 =$ | | 0.006 | | | |
| $L_9$ | $r_{16} = +0.929$ | $d_9 =$ | | 0.148 | 1.620 | 60.3 | $\Phi_{16} = +0.6674$ |
| | $r_{17} = +1.421$ | | | | | | |
| | | $s_8 =$ | | 0.208 | | | |
| $L_{10}$ | $r_{18} = -1.024$ | $d_{10} =$ | | 0.237 | 1.847 | 23.8 | $\Phi_{18} = -0.8271$ |
| | $r_{19} = +0.948$ | | | | | | |
| | | $s_9 =$ | | 0.170 | | | |
| $L_{11}$ | $r_{20} = +17.254$ | $d_{11} =$ | | 0.170 | 1.713 | 53.8 | $\Phi_{19} = -0.8935$ |
| | $r_{21} = -0.726$ | | | | | | $\Phi_{21} = +0.9821$ |
| | | $s_{10} =$ | | 0.006 | | | |
| $L_{12}$ | $r_{22} = +0.831$ | $d_{12} =$ | | 0.117 | 1.670 | 47.1 | $\Phi_{22} = +0.8063$ |
| | $r_{23} = +2.965$ | | | | | | |

$f_{min} = 0.589$
$f_{med} = 1$
$f_{max} = 1.624$
relative aperture = 1:1.2
$f_2 = 0.875$
$f_3 = +3.782$

TABLE VI

| Lens | Radii | | Thicknesses and Separations | | $n_d$ | $v_d$ | Surface Powers |
|---|---|---|---|---|---|---|---|
| $L_1$ | $r_1 = +7.407$ | $d_1 =$ | | 0.106 | 1.805 | 25.4 | |
| | $r_2 = +2.078$ | | | | | | |

TABLE VI-continued

| Lens | Radii | | Thicknesses and Separations | $n_d$ | $\nu_d$ | Surface Powers |
|---|---|---|---|---|---|---|
| | | $s_1 =$ | 0.143 | | | |
| $L_2$ | $r_3 = +2.777$ | $d_2 =$ | 0.304 | 1.620 | 60.3 | |
| | $r_4 = -14.400$ | | | | | |
| | | $s_2 =$ | 0.006 | | | |
| $L_3$ | $r_5 = +1.834$ | $d_3 =$ | 0.373 | 1.720 | 50.4 | |
| | $r_6 = -106.546$ | | | | | |
| | | $s_3 =$ | $\begin{cases} 0.047\ f_{min} \\ 0.585\ f_{med} \\ 0.908\ f_{max} \end{cases}$ | | | |
| $L_4$ | $r_7 = -72.727$ | $d_4 =$ | 0.059 | 1.713 | 53.8 | |
| | $r_8 = +0.821$ | | | | | |
| | | $s_4 =$ | 0.165 | | | |
| $L_5$ | $r_9 = -2.394$ | $d_5 =$ | 0.056 | 1.589 | 61.3 | |
| | $r_{10} = +0.913$ | | | | | |
| $L_6$ | | $d_6 =$ | 0.149 | 1.805 | 25.4 | |
| | $r_{11} = +2.835$ | | | | | |
| | | $s_5 =$ | $\begin{cases} 1.030\ f_{min} \\ 0.725\ f_{med} \\ 0.179\ f_{max} \end{cases}$ | | | |
| $L_7$ | $r_{12} = +2.090$ | $d_7 =$ | 0.137 | 1.517 | 64.2 | |
| | $r_{13} = -11.604$ | | | | | |
| | | $s_6 =$ | $\begin{cases} 0.581 + 0.280\ f_{min} \\ 0.348 + 0.280\ f_{med} \\ 0.571 + 0.280\ f_{max} \end{cases}$ | | | |
| $L_8$ | $r_{14} = +1.076$ | $d_8 =$ | 0.196 | 1.620 | 60.3 | $\Phi_{14} = +0.5762$ |
| | $r_{15} = \infty$ | | | | | |
| | | $s_7 =$ | 0.006 | | | |
| $L_9$ | $r_{16} = +0.752$ | $d_9 =$ | 0.149 | 1.620 | 60.3 | $\Phi_{16} = +0.8245$ |
| | $r_{17} = +1.305$ | | | | | |
| | | $s_9 =$ | 0.155 | | | |
| $L_{10}$ | $r_{18} = -1.886$ | $d_{10} =$ | 0.146 | 1.847 | 23.8 | $\Phi_{18} = -0.4491$ |
| | $r_{19} = +0.802$ | | | | | $\Phi_{19} = -1.0562$ |
| | | $s_9 =$ | 0.180 | | | |
| $L_{11}$ | $r_{20} = \infty$ | $d_{11} =$ | 0.146 | 1.720 | 50.4 | |
| | $r_{21} = -0.974$ | | | | | $\Phi_{21} = +0.7392$ |
| | | $s_{10} =$ | 0.006 | | | $\Phi_{22} = +0.7392$ |
| $L_{12}$ | $r_{22} = +0.974$ | $d_{12} =$ | 0.146 | 1.720 | 50.4 | |
| | $r_{23} = \infty$ | | | | | |

$f_{min} = 0.591$
$f_{med} = 1$
$f_{max} = 1.632$
relative aperture = 1:1.2
$f_2 = -0.808$
$f_3 = +3.439$

TABLE VII

| Lens | Radii | | Thicknesses and Separations | $n_d$ | $\nu_d$ | Surface Powers |
|---|---|---|---|---|---|---|
| $L_1$ | $r_1 = +6.761$ | $d_1 =$ | 0.106 | 1.805 | 25.4 | |
| | $r_2 = +2.046$ | | | | | |
| | | $s_1 =$ | 0.155 | | | |
| $L_2$ | $r_3 = +2.744$ | $d_2 =$ | 0.304 | 1.620 | 60.3 | |
| | $r_4 = -17.711$ | | | | | |
| | | $s_2 =$ | 0.006 | | | |
| $L_3$ | $r_5 = +1.816$ | $d_3 =$ | 0.373 | 1.720 | 50.4 | |
| | $r_6 = -311.112$ | | | | | |
| | | $s_3 =$ | $\begin{cases} 0.049\ f_{min} \\ 0.588\ f_{med} \\ 0.910\ f_{max} \end{cases}$ | | | |
| $L_4$ | $r_7 = -72.727$ | $d_4 =$ | 0.059 | 1.713 | 53.8 | |
| | $r_8 = +0.821$ | | | | | |
| | | $s_4 =$ | 0.165 | | | |
| $L_5$ | $r_9 = -2.394$ | $d_5 =$ | 0.056 | 1.589 | 61.3 | |

TABLE VII-continued

| Lens | Radii | Thicknesses and Separations | $n_d$ | $v_d$ | Surface Powers |
|---|---|---|---|---|---|
| $L_6$ | $r_{10} = +0.913$ $r_{11} = +2.835$ | $d_6 = 0.149$ | 1.805 | 25.4 | |
| | | $s_5 = \begin{cases} 1.030\ f_{min} \\ 0.725\ f_{med} \\ 0.179\ f_{max} \end{cases}$ | | | |
| $L_7$ | $r_{12} = +2.090$ $r_{13} = -11.604$ | $d_7 = 0.137$ | 1.517 | 64.2 | |
| | | $s_6 = \begin{cases} 0.581 + 0.280\ f_{min} \\ 0.348 + 0.280\ f_{med} \\ 0.571 + 0.280\ f_{max} \end{cases}$ | | | |
| $L_8$ | $r_{14} = +1.076$ $r_{15} = \infty$ | $d_8 = 0.196$ | 1.620 | 60.3 | $\Phi_{14} = +0.5762$ |
| | | $s_7 = 0.006$ | | | |
| $L_9$ | $r_{16} = +0.752$ $r_{17} = +1.305$ | $d_9 = 0.149$ | 1.620 | 60.3 | $\Phi_{16} = +0.8245$ |
| | | $s_8 = 0.155$ | | | |
| $L_{10}$ | $r_{18} = -1.886$ $r_{19} = +0.802$ | $d_{10} = 0.146$ | 1.847 | 23.8 | $\Phi_{18} = -0.4491$ $\Phi_{19} = -1.0562$ |
| | | $s_9 = 0.180$ | | | |
| $L_{11}$ | $r_{20} = \infty$ $r_{21} = -0.974$ | $d_{11} = 0.146$ | 1.720 | 50.4 | $\Phi_{21} = +0.7392$ |
| | | $s_{10} = 0.006$ | | | |
| $L_{12}$ | $r_{22} = +0.974$ $r_{23} = \infty$ | $d_{12} = 0.146$ | 1.720 | 50.4 | $\Phi_{22} = +0.7392$ |

$f_{min} = 0.591$
$f_{med} = 1$
$f_{max} = 1.634$
relative aperture = 1:1.2
$f_2 = -0.808$
$f_3 = +3.439$

We claim:

1. A pancratic objective comprising a varifocal front lens group and a fixed-focus rear lens group, said front lens group consisting of a substantially stationary first component of positive refractivity, an axially shiftable second component of negative refractivity and an axially shiftable third component of positive refractivity, said third component being a weakly refractive single lens whose individual focal length $f_3$ is related to the individual focal length $f_2$ of said second component by a ratio $f_3/|f_2|$ exceeding 1.5 times the ratio $f_{max}/f_{min}$ where $f_{max}$ is the maximum overall focal length and $f_{min}$ is the minimum overall focal length of said varifocal front lens group;

said first component consisting of a negative first lens, a positive second lens and a positive third lens air-spaced from one another, said second component consisting of a negative fourth lens and a doublet composed of a negative fifth lens and a positive sixth lens, said third component constituting a seventh lens, said rear lens group consisting of five air-spaced lenses including a positive eighth lens, a positive ninth lens, a negative tenth lens, a positive eleventh lens and a positive twelfth lens, said eighth lens being generally planoconvex and having a forwardly facing convex surface whose power ranges between 0.4 and 0.7 times $\Phi_{med}$, said ninth lens being a positive meniscus having a forwardly facing convex surface whose power ranges between 0.6 and 0.9 times $\Phi_{med}$, said tenth lens being biconcave, said eleventh and twelfth lenses being generally planoconvex, $\Phi_{med}$ being the median power of the objective with said third component in a position closest to said rear lens group.

2. A pancratic objective as defined in claim 1 wherein said tenth lens has a less strongly curved forwardly facing surface and a more stronly curved rearwardly facing surface whose power ratio is less than 2.5, said eleventh lens having a rearwardly facing convex surface whose power ranges between $0.7\Phi_{med}$ and $\Phi_{med}$, said twelfth lens having a forwardly facing convex surface whose power ranges between $0.7\Phi_{med}$ and $\Phi_{med}$.

3. A pancratic objective as defined in claim 1 or 2 wherein $|f_2| < f_{med}$.

4. A pancratic objective as defined in claim 2 wherein said first lens $L_1$, said second lens $L_2$, said third lens $L_3$, said fourth lens $L_4$, said fifth lens $L_5$, said sixth lens $L_6$, said seventh lens $L_7$, said eighth lens $L_8$, said ninth lens $L_9$, said tenth lens $L_{10}$, said eleventh lens $L_{11}$ and said twelfth lens $L_{12}$ have radii $r_1$ to $r_{23}$, thicknesses $d_1$ to $d_{12}$ and separations $s_1$ to $s_{10}$ whose numerical values, based upon a value of unity for a median overall focal length $f_{med}$, together with their refractive indices $n_d$ and Abbe numbers $v_d$ are substantially as given in the following table:

| Lens | Radii | Thicknesses and Separations | $n_d$ | $v_d$ |
|---|---|---|---|---|
| $L_1$ | $r_1 = +6.4$ $r_2 = +2.0$ | $d_1 = 0.11$ | 1.8 | 25 |
| | | $s_1 = 0.14$ | | |
| $L_2$ | $r_3 = +2.7$ $r_4 = -13.8$ | $d_2 = 0.31$ | 1.60 | 61 |

-continued

| Lens | Radii | Thicknesses and Separations | | $n_d$ | $\nu_d$ |
|---|---|---|---|---|---|
| | | $s_2 =$ | 0.01 | | |
| $L_3$ | $r_5 = +1.7$ | $d_3 =$ | 0.37 | 1.66 | 51 |
| | $r_6 = -42.5$ | | | | |
| | | $s_3 =$ | 0.05 $f_{min}$ 0.59 $f_{med}$ 0.91 $f_{max}$ | | |
| $L_4$ | $r_7 = -72.8$ | $d_4 =$ | 0.06 | 1.71 | 54 |
| | $r_8 = +0.8$ | | | | |
| | | $s_4 =$ | 0.17 | | |
| $L_5$ | $r_9 = -2.4$ | $d_5 =$ | 0.06 | 1.59 | 61 |
| | $r_{10} = +0.9$ | | | | |
| $L_6$ | $r_{11} = +2.8$ | $d_6 =$ | 0.15 | 1.81 | 25 |
| | | $s_5 =$ | 1.03 $f_{min}$ 0.73 $f_{med}$ 0.18 $f_{max}$ | | |
| $L_7$ | $r_{12} = +2.1$ | $d_7 =$ | 0.14 | 1.52 | 64 |
| | $r_{13} = -11.6$ | | | | |
| | | $s_6 =$ | 0.58 +0.28 $f_{min}$ 0.35 +0.28 $f_{med}$ 0.57 +0.28 $f_{max}$ | | |
| $L_8$ | $r_{14} = +1.0$ | $d_8 =$ | 0.21 | 1.62 | 60 |
| | $r_{15} = -10.4$ | | | | |
| | | $s_7 =$ | 0.01 | | |
| $L_9$ | $r_{16} = +0.8$ | $d_9 =$ | 0.14 | 1.62 | 47 |
| | $r_{17} = +1.7$ | | | | |
| | | $s_8 =$ | 0.14 | | |
| $L_{10}$ | $r_{18} = -1.5$ | $d_{10} =$ | 0.14 | 1.85 | 24 |
| | $r_{19} = +0.8$ | | | | |
| | | $s_9 =$ | 0.21 | | |
| $L_{11}$ | $r_{20} = -56.8$ | $d_{11} =$ | 0.17 | 1.71 | 54 |
| | $r_{21} = -0.8$ | | | | |
| | | $s_{10} =$ | 0.01 | | |
| $L_{12}$ | $r_{22} = +0.9$ | $d_{12} =$ | 0.12 | 1.72 | 48 |
| | $r_{23} = +2.4$ | | | | |

5. A pancratic objective as defined in claim 2 wherein said first lens $L_1$, said second lens $L_2$, said third lens $L_3$, said fourth lens $L_4$, said fifth lens $L_5$, said sixth lens $L_6$, said seventh lens $L_7$, said eighth lens $L_8$, said ninth lens $L_9$, said tenth lens $L_{10}$, said eleventh lens $L_{11}$ and said twelfth lens $L_{12}$ have radii $r_1$ to $r_{23}$, thicknesses $d_1$ to $d_{12}$ and separations $s_1$ to $s_{10}$ whose numerical values, based upon a value of unity for a median overall focal length $f_{med}$, together with their refractive indices $n_d$ and Abbe numbers $\nu_d$ are substantially as given in the following table:

| Lens | Radii | Thicknesses and Separations | | $n_d$ | $\nu_d$ |
|---|---|---|---|---|---|
| $L_1$ | $r_1 = +6.4$ | $d_1 =$ | 0.11 | 1.81 | 25 |
| | $r_2 = +2.0$ | | | | |
| | | $s_1 =$ | 0.14 | | |
| $L_2$ | $r_3 = +2.6$ | $d_2 =$ | 0.30 | 1.60 | 61 |
| | $r_4 = -13.7$ | | | | |
| | | $s_2 =$ | 0.01 | | |
| $L_3$ | $r_5 = +1.7$ | $d_3 =$ | 0.36 | 1.65 | 56 |
| | $r_6 = -70.3$ | | | | |
| | | $s_3 =$ | 0.05 $f_{min}$ 0.58 $f_{med}$ 0.91 $f_{max}$ | | |
| | $r_7 = \infty$ | | | | |

-continued

| Lens | Radii | Thicknesses and Separations | | $n_d$ | $\nu_d$ |
|---|---|---|---|---|---|
| $L_4$ | $r_8 = +0.8$ | $d_4 =$ | 0.06 | 1.71 | 54 |
| | | $s_4 =$ | 0.17 | | |
| $L_5$ | $r_9 = -2.8$ | $d_5 =$ | 0.06 | 1.64 | 58 |
| | $r_{10} = +0.9$ | | | | |
| $L_6$ | $r_{11} = +2.7$ | $d_6 =$ | 0.15 | 1.85 | 24 |
| | | $s_5 =$ | 1.06 $f_{min}$ 0.75 $f_{med}$ 0.19 $f_{max}$ | | |
| $L_7$ | $r_{12} = +2.4$ | $d_7 =$ | 0.14 | 1.70 | 55 |
| | $r_{13} = \infty$ | | | | |
| | | $s_6 =$ | 0.58 +0.16 $f_{min}$ 0.35 +0.16 $f_{med}$ 0.58 +0.16 $f_{max}$ | | |
| $L_8$ | $r_{14} = +1.5$ | $d_8 =$ | 0.19 | 1.62 | 60 |
| | $r_{15} = -6.7$ | | | | |
| | | $s_7 =$ | 0.01 | | |
| $L_9$ | $r_{16} = +0.9$ | $d_9 =$ | 0.15 | 1.62 | 60 |
| | $r_{17} = +2.1$ | | | | |
| | | $s_8 =$ | 0.21 | | |
| $L_{10}$ | $r_{18} = -1.7$ | $d_{10} =$ | 0.14 | 1.85 | 24 |
| | $r_{19} = +0.9$ | | | | |
| | | $s_9 =$ | 0.26 | | |
| $L_{11}$ | $r_{20} = +9.2$ | $d_{11} =$ | 0.17 | 1.71 | 54 |
| | $r_{21} = +1.0$ | | | | |
| | | $s_{10} =$ | 0.01 | | |
| $L_{12}$ | $r_{22} = +0.9$ | $d_{12} =$ | 0.12 | 1.72 | 48 |
| | $r_{23} = +4.5$ | | | | |

6. A pancratic objective as defined in claim 1 wherein said first lens $L_1$, said second lens $L_2$, said third lens $L_3$, said fourth lens $L_4$, said fifth lens $L_5$, said sixth lens $L_6$, said seventh lens $L_7$, said eighth lens $L_8$, said ninth lens $L_9$, said tenth lens $L_{10}$, said eleventh lens $L_{11}$ and said twelfth lens $L_{12}$ have radii $r_1$ to $r_{23}$, thicknesses $d_1$ to $d_{12}$ and separations $s_1$ to $s_{10}$ whose numerical values, based upon a value of unity for a median overall focal length $f_{med}$, together with their refractive indices $n_d$ and Abbe numbers $\nu_d$ are substantially as given in the following table:

| Lens | Radii | Thicknesses and Separations | | $n_d$ | $\nu_4$ |
|---|---|---|---|---|---|
| $L_1$ | $r_1 = +6.4$ | $d_1 =$ | 0.11 | 1.81 | 25 |
| | $r_2 = +2.0$ | | | | |
| | | $s_1 =$ | 0.14 | | |
| $L_2$ | $r_3 = +2.6$ | $d_2 =$ | 0.30 | 1.60 | 61 |
| | $r_4 = -13.7$ | | | | |
| | | $s_2 =$ | 0.01 | | |
| $L_3$ | $r_5 = +1.7$ | $d_3 =$ | 0.36 | 1.65 | 56 |
| | $r_6 = -70.3$ | | | | |
| | | $s_3 =$ | 0.05 $f_{min}$ 0.58 $f_{med}$ 0.91 $f_{max}$ | | |
| $L_4$ | $r_7 = \infty$ | $d_4 =$ | 0.06 | 1.71 | 54 |
| | $r_8 = +0.8$ | | | | |
| | | $s_4 =$ | 0.17 | | |
| $L_5$ | $r_9 = -2.8$ | $d_5 =$ | 0.06 | 1.64 | 58 |
| | $r_{10} = +0.9$ | | | | |
| $L_6$ | $r_{11} = +2.7$ | $d_6 =$ | 0.15 | 1.85 | 24 |

-continued

| Lens | Radii | | Thicknesses and Separations | $n_d$ | $v_d$ |
|---|---|---|---|---|---|
| | | $s_5 =$ | $\begin{cases} 1.06\ f_{min} \\ 0.75\ f_{med} \\ 0.19\ f_{max} \end{cases}$ | | |
| $L_7$ | $\begin{cases} r_{12} = +2.1 \\ r_{13} = \infty \end{cases}$ | $d_7 =$ | 0.14 | 1.62 | 60 |
| | | $s_6 =$ | $\begin{cases} 0.58 +0.16\ f_{min} \\ 0.35 +0.16\ f_{med} \\ 0.58 +0.16\ f_{max} \end{cases}$ | | |
| $L_8$ | $\begin{cases} r_{14} = +1.4 \\ r_{15} = -13.8 \end{cases}$ | $d_8 =$ | 0.19 | 1.62 | 60 |
| | | $s_7 =$ | 0.01 | | |
| $L_9$ | $\begin{cases} r_{16} = +0.9 \\ r_{17} = +2.2 \end{cases}$ | $d_9 =$ | 0.15 | 1.62 | 60 |
| | | $s_8 =$ | 0.21 | | |
| $L_{10}$ | $\begin{cases} r_{18} = -1.5 \\ r_{19} = +1.0 \end{cases}$ | $d_{10} =$ | 0.23 | 1.85 | 24 |
| | | $s_9 =$ | 0.17 | | |
| $L_{11}$ | $\begin{cases} r_{20} = +5.2 \\ r_{21} = -0.9 \end{cases}$ | $d_{11} =$ | 0.17 | 1.71 | 54 |
| | | $s_{10} =$ | 0.01 | | |
| $L_{12}$ | $\begin{cases} r_{22} = +0.9 \\ r_{23} = +5.2 \end{cases}$ | $d_{12} =$ | 0.12 | 1.67 | 47 |

7. A pancratic objective as defined in claim 1 wherein said first lens $L_1$, said second lens $L_2$, said third lens $L_3$, said fourth lens $L_4$, said firth lens $L_5$, said sixth lens $L_6$, said seventh lens $L_7$, said eighth lens $L_8$, said ninth lens $L_9$, said tenth lens $L_{10}$, said eleventh lens $L_{11}$ and said twelfth lens $L_{12}$ have radii $r_1$ to $r_{23}$, thicknesses $d_1$ to $d_{12}$ and separations $s_1$ to $s_{10}$ whose numerical values, based upon a value of unity for a median overall focal length $f_{med}$, together with their refractive indices $n_d$ and Abbe numbers $v_d$ are substantially as given in the following table:

| Lens | Radii | | Thicknesses and Separations | $n_d$ | $v_d$ |
|---|---|---|---|---|---|
| $L_1$ | $\begin{cases} r_1 = +6.4 \\ r_2 = +1.9 \end{cases}$ | $d_1 =$ | 0.11 | 1.81 | 25 |
| | | $s_1 =$ | 0.14 | | |
| $L_2$ | $\begin{cases} r_3 = +2.5 \\ r_4 = -13.7 \end{cases}$ | $d_2 =$ | 0.30 | 1.60 | 61 |
| | | $s_2 =$ | 0.01 | | |
| $L_3$ | $\begin{cases} r_5 = +1.7 \\ r_6 = -70.3 \end{cases}$ | $d_3 =$ | 0.36 | 1.65 | 56 |
| | | $s_3 =$ | $\begin{cases} 0.04\ f_{min} \\ 0.58\ f_{med} \\ 0.90\ f_{max} \end{cases}$ | | |
| $L_4$ | $\begin{cases} r_7 = -31.0 \\ r_8 = +0.8 \end{cases}$ | $d_4 =$ | 0.06 | 1.71 | 54 |
| | | $s_4 =$ | 0.17 | | |
| $L_5$ | $\begin{cases} r_9 = -3.4 \\ \end{cases}$ | $d_5 =$ | 0.06 | 1.64 | 58 |
| $L_6$ | $\begin{cases} r_{10} = +0.9 \\ r_{11} = +2.4 \end{cases}$ | $d_6 =$ | 0.15 | 1.85 | 24 |
| | | $s_5 =$ | $\begin{cases} 1.06\ f_{min} \\ 0.75\ f_{med} \\ 0.20\ f_{max} \end{cases}$ | | |
| $L_7$ | $\begin{cases} r_{12} = +2.1 \\ r_{13} = \infty \end{cases}$ | $d_7 =$ | 0.14 | 1.62 | 60 |
| | | $s_6 =$ | $\begin{cases} 0.58 + 0.16\ f_{min} \\ 0.35 + 0.16\ f_{med} \\ 0.58 + 0.16\ f_{max} \end{cases}$ | | |
| $L_8$ | $\begin{cases} r_{14} = +1.4 \\ r_{15} = -5.6 \end{cases}$ | $d_8 =$ | 0.19 | 1.62 | 60 |
| | | $s_7 =$ | 0.01 | | |
| $L_9$ | $\begin{cases} r_{16} = +1.0 \\ r_{17} = +2.5 \end{cases}$ | $d_9 =$ | 0.15 | 1.62 | 60 |
| | | $s_8 =$ | 0.21 | | |
| $L_{10}$ | $\begin{cases} r_{18} = -1.3 \\ r_{19} = +1.0 \end{cases}$ | $d_{10} =$ | 0.23 | 1.85 | 24 |
| | | $s_9 =$ | 0.17 | | |
| $L_{11}$ | $\begin{cases} r_{20} = +4.2 \\ r_{21} = -0.9 \end{cases}$ | $d_{11} =$ | 0.17 | 1.71 | 54 |
| | | $s_{10} =$ | 0.01 | | |
| $L_{12}$ | $\begin{cases} r_{22} = +.08 \\ r_{23} = +2.5 \end{cases}$ | $d_{12} =$ | 0.12 | 1.67 | 47 |

8. A pancratic objective as defined in claim 2 wherein said first lens $L_1$, said second lens $L_2$, said third lens $L_3$, said fourth lens $L_4$, said fifth lens $L_5$, said sixth lens $L_6$, said seventh lens $L_7$, said eighth lens $L_8$, said ninth lens $L_9$, said tenth lens $L_{10}$, said eleventh lens $L_{11}$ and said twelfth lens $L_{12}$ have radii $r_1$ to $r_{23}$, thicknesses $d_1$ to $d_{12}$ and separations $s_1$ to $s_{10}$ whose numerical values, based upon a value of unity for a median overall focal length $f_{med}$, together with their refractive indices $n_d$ and Abbe numbers $v_d$ are substantially as given in the following table:

| Lens | Radii | | Thicknesses and Separations | $n_d$ | $v_d$ |
|---|---|---|---|---|---|
| $L_1$ | $\begin{cases} r_1 = +7.0 \\ r_2 = +2.1 \end{cases}$ | $d_1 =$ | 0.11 | 1.81 | 25 |
| | | $s_1 =$ | 0.16 | | |
| $L_2$ | $\begin{cases} r_3 = +2.8 \\ r_4 = -15.0 \end{cases}$ | $d_2 =$ | 0.32 | 1.60 | 61 |
| | | $s_2 =$ | 0.01 | | |
| $L_3$ | $\begin{cases} r_5 = +1.9 \\ r_6 = -77.7 \end{cases}$ | $d_3 =$ | 0.36 | 1.65 | 56 |
| | | $s_3 =$ | $\begin{cases} 0.06\ f_{min} \\ 0.66\ f_{med} \\ 1.02\ f_{max} \end{cases}$ | | |
| $L_4$ | $\begin{cases} r_7 = \infty \\ r_8 = +0.9 \end{cases}$ | $d_4 =$ | 0.06 | 1.71 | 54 |
| | | $s_4 =$ | 0.18 | | |
| $L_5$ | $\begin{cases} r_9 = -2.5 \\ \end{cases}$ | $d_5 =$ | 0.06 | 1.64 | 58 |
| $L_6$ | $\begin{cases} r_{10} = +1.0 \\ r_{11} = +3.4 \end{cases}$ | $d_6 =$ | 0.16 | 1.85 | 24 |
| | | $s_5 =$ | $\begin{cases} 1.14\ f_{min} \\ 0.83\ f_{med} \\ 0.27\ f_{max} \end{cases}$ | | |
| $L_7$ | $\begin{cases} r_{12} = +2.3 \\ r_{13} = \infty \end{cases}$ | $d_7 =$ | 0.14 | 1.62 | 60 |
| | | $s_6 =$ | $\begin{cases} 0.64 +0.16\ f_{min} \\ 0.35 +0.16\ f_{med} \\ 0.55 +0.16\ f_{max} \end{cases}$ | | |
| $L_8$ | $\begin{cases} r_{14} = +1.1 \\ r_{15} = -4.1 \end{cases}$ | $d_8 =$ | 0.15 | 1.62 | 60 |
| | | $s_7 =$ | 0.01 | | |
| $L_9$ | $\begin{cases} r_{16} = +0.9 \\ r_{17} = +1.4 \end{cases}$ | $d_9 =$ | 0.15 | 1.62 | 60 |
| | | $s_8 =$ | 0.21 | | |

-continued

| Lens | Radii | | Thicknesses and Separations | $n_d$ | $\nu_d$ |
|---|---|---|---|---|---|
| $L_{10}$ | $r_{18} = -1.0$ | $d_{10} =$ | 0.24 | 1.85 | 24 |
| | $r_{19} = +0.9$ | | | | |
| | | $s_9 =$ | 0.17 | | |
| $L_{11}$ | $r_{20} = +17.3$ | $d_{11} =$ | 0.17 | 1.71 | 54 |
| | $r_{21} = -0.7$ | | | | |
| | | $s_{10} =$ | 0.01 | | |
| $L_{12}$ | $r_{22} = +0.8$ | $d_{12} =$ | 0.12 | 1.67 | 47 |
| | $r_{23} = +3.0$ | | | | |

9. A pancratic objective as defined in claim 2 wherein said first lens $L_1$, said second lens $L_2$, said third lens $L_3$, said fourth lens $L_4$, said fifth lens $L_5$, said sixth lens $L_6$, said seventh lens $L_7$, said eighth lens $L_8$, said ninth lens $L_9$, said tenth lens $L_{10}$, said eleventh lens $L_{11}$ and said twelfth lens $L_{12}$ have radii $r_1$ to $r_{23}$, thicknesses $d_1$ to $d_{12}$ and separations $s_1$ to $s_{10}$ whose numerical values, based upon a value of unity for a median overall focal length $f_{med}$, together with their refractive indices $n_d$ and Abbe numbers $\nu_d$ are substantially as given in the following table:

| Lens | Radii | | Thicknesses and Separations | $n_d$ | $\nu_d$ |
|---|---|---|---|---|---|
| $L_1$ | $r_1 = +7.4$ | $d_1 =$ | 0.11 | 1.81 | 25 |
| | $r_2 = +2.1$ | | | | |
| | | $s_1 =$ | 0.14 | | |
| $L_2$ | $r_3 = +2.8$ | $d_2 =$ | 0.30 | 1.62 | 60 |
| | $r_4 = -14.4$ | | | | |
| | | $s_2 =$ | 0.01 | | |
| $L_3$ | $r_5 = +1.8$ | $d_3 =$ | 0.37 | 1.72 | 50 |
| | $r_6 = -106.5$ | | | | |
| | | $s_3 =$ | $\begin{cases} 0.05\ f_{min} \\ 0.59\ f_{med} \\ 0.91\ f_{max} \end{cases}$ | | |
| $L_4$ | $r_7 = -72.7$ | $d_4 =$ | 0.06 | 1.71 | 54 |
| | $r_8 = +0.8$ | | | | |
| | | $s_4 =$ | 0.17 | | |
| $L_5$ | $r_9 = -2.4$ | $d_5 =$ | 0.06 | 1.59 | 61 |
| | $r_{10} = +0.9$ | | | | |
| $L_6$ | $r_{11} = +2.8$ | $d_6 =$ | 0.15 | 1.81 | 25 |
| | | $s_5 =$ | $\begin{cases} 1.03\ f_{min} \\ 0.73\ f_{med} \\ 0.18\ f_{max} \end{cases}$ | | |
| $L_7$ | $r_{12} = +2.1$ | $d_7 =$ | 0.14 | 1.52 | 64 |
| | $r_{13} = -11.6$ | | | | |
| | | $s_6 =$ | $\begin{cases} 0.58 + 0.28\ f_{min} \\ 0.35 + 0.28\ f_{med} \\ 0.57 + 0.28\ f_{max} \end{cases}$ | | |
| $L_8$ | $r_{14} = +1.1$ | $d_8 =$ | 0.20 | 1.62 | 60 |
| | $r_{15} = \infty$ | | | | |
| | | $s_7 =$ | 0.01 | | |
| $L_9$ | $r_{16} = +0.8$ | $d_9 =$ | 0.15 | 1.62 | 60 |
| | $r_{17} = +1.3$ | | | | |
| | | $s_8 =$ | 0.16 | | |
| $L_{10}$ | $r_{18} = -1.9$ | $d_{10} =$ | 0.15 | 1.85 | 24 |
| | $r_{19} = +0.8$ | | | | |
| | | $s_9 =$ | 0.18 | | |
| $L_{11}$ | $r_{20} = \infty$ | $d_{11} =$ | 0.15 | 1.72 | 50 |
| | $r_{21} = -1.0$ | | | | |
| | | $s_{10} =$ | 0.01 | | |
| $L_{12}$ | $r_{22} = +1.0$ | $d_{12} =$ | 0.15 | 1.72 | 50 |
| | $r_{23} = \infty$ | | | | |

10. A pancratic objective as defined in claim 2 wherein said first lens $L_1$, said second lens $L_2$, said third lens $L_3$, said fourth lens $L_4$, said fifth lens $L_5$, said sixth lens $L_6$, said seventh lens $L_7$, said eighth lens $L_8$, said ninth lens $L_9$, said tenth lens $L_{10}$, said eleventh lens $L_{11}$ and said twelfth lens $L_{12}$ have radii $r_1$ to $r_{23}$, thicknesses $d_1$ to $d_{12}$ and separations $s_1$ to $s_{10}$ whose numerical values, based upon a value of unity for a median overall focal length $f_{med}$, together with their refractive indices $n_d$ and Abbe numbers $\nu_d$ are substantially as given in the following table:

| Lens | Radii | | Thicknesses and Separations | $n_d$ | $\nu_d$ |
|---|---|---|---|---|---|
| $L_1$ | $r_1 = +6.8$ | $d_1 =$ | 0.11 | 1.81 | 25 |
| | $r_2 = +2.0$ | | | | |
| | | $s_1 =$ | 0.16 | | |
| $L_2$ | $r_3 = +2.7$ | $d_2 =$ | 0.30 | 1.62 | 60 |
| | $r_4 = -17.7$ | | | | |
| | | $s_2 =$ | 0.01 | | |
| $L_3$ | $r_5 = +1.8$ | $d_3 =$ | 0.37 | 1.72 | 50 |
| | $r_6 = -311.1$ | | | | |
| | | $s_3 =$ | $\begin{cases} 0.05\ f_{min} \\ 0.59\ f_{med} \\ 0.91\ f_{max} \end{cases}$ | | |
| $L_4$ | $r_7 = -72.7$ | $d_4 =$ | 0.06 | 1.71 | 54 |
| | $r_8 = +0.8$ | | | | |
| | | $s_4 =$ | 0.17 | | |
| $L_5$ | $r_9 = -2.4$ | $d_5 =$ | 0.06 | 1.59 | 61 |
| | $r_{10} = +0.9$ | | | | |
| $L_6$ | $r_{11} = +2.8$ | $d_6 =$ | 0.15 | 1.81 | 25 |
| | | $s_5 =$ | $\begin{cases} 1.03\ f_{min} \\ 0.73\ f_{med} \\ 0.18\ f_{max} \end{cases}$ | | |

-continued

| Lens | Radii | Thicknesses and Separations | | $n_d$ | $\nu_d$ |
|---|---|---|---|---|---|
| $L_7$ | $r_{12} = +2.1$ $r_{13} = -11.6$ | $d_7 =$ | 0.14 | 1.52 | 64 |
| | | $s_6 =$ | $\begin{cases} 0.58 + 0.28\ f_{min} \\ 0.35 + 0.28\ f_{med} \\ 0.57 + 0.28\ f_{max} \end{cases}$ | | |
| $L_8$ | $r_{14} = +1.08$ $r_{15} = \infty$ | $d_8 =$ | 0.20 | 1.62 | 60 |
| | | $s_7 =$ | 0.01 | | |
| $L_9$ | $r_{16} = +0.8$ $r_{17} = +1.3$ | $d_9 =$ | 0.15 | 1.62 | 60 |
| | | $s_8 =$ | 0.16 | | |
| $L_{10}$ | $r_{18} = -1.9$ $r_{19} = +0.8$ | $d_{10} =$ | 0.15 | 1.85 | 24 |
| | | $s_9 =$ | 0.18 | | |
| $L_{11}$ | $r_{20} = \infty$ $r_{21} = -1.0$ | $d_{11} =$ | 0.15 | 1.72 | 50 |
| | | $s_{10} =$ | 0.01 | | |
| $L_{12}$ | $r_{22} = +1.0$ $r_{23} = \infty$ | $d_{12} =$ | 0.15 | 1.72 | 50 |